United States Patent [19]

Schwartz

[11] Patent Number: 5,128,114

[45] Date of Patent: Jul. 7, 1992

[54] SILICA MICROSPHERES, METHOD OF IMPROVING ATTRITION RESISTANCE

[75] Inventor: Jo-Ann T. Schwartz, Chadds Ford, Pa.

[73] Assignee: E. I. Du Pont de Nemours and Company, Wilmington, Del.

[21] Appl. No.: 587,879

[22] Filed: Sep. 25, 1990

Related U.S. Application Data

[63] Continuation-in-part of Ser. No. 344,975, Apr. 14, 1989, abandoned.

[51] Int. Cl.$^5$ ............................................. C01B 33/12
[52] U.S. Cl. ................................. 423/335; 423/584; 501/53; 501/80; 501/133; 502/261; 502/262
[58] Field of Search ............... 423/584, 335; 502/261, 502/262; 501/82, 84, 85, 80, 53, 54, 133; 264/43, 44, 59

[56] References Cited

U.S. PATENT DOCUMENTS

| | | | |
|---|---|---|---|
| 3,301,635 | 7/1965 | Bergna et al. | 423/335 |
| 3,591,518 | 7/1971 | McMillan | 423/335 |
| 4,010,242 | 3/1977 | Iler et al. | 423/592 |
| 4,376,724 | 3/1983 | Mita et al. | 502/261 |
| 4,420,420 | 12/1983 | Mita et al. | 502/261 |
| 4,832,938 | 5/1989 | Gosser et al. | 423/584 |
| 4,913,966 | 4/1990 | Garvey et al. | 423/335 |

FOREIGN PATENT DOCUMENTS

| | | | |
|---|---|---|---|
| 0117306 | 9/1984 | European Pat. Off. | 423/584 |
| 2149340 | 7/1987 | Japan | 502/261 |

OTHER PUBLICATIONS

"Adsordents, Catalysts, Supports and Their Manufacture", Jeemusu (1989) Chemical Abstract Japan JP 01307444 (Dec. 12, 1989).

Primary Examiner—Karl Group
Assistant Examiner—Paul Marcantoni
Attorney, Agent, or Firm—Caroline J. Yun

[57] ABSTRACT

High-strength, non-agglomerated uniform porous microspheres of silica produced by spray drying a mixture comprising a colloidal silica sol and an additive selected from ammonium citrate or urea; an attrition resistant catalytic composite consisting essentially of metal crystallites such as palladium, platinum-palladium on said silica microsphere and method for preparing the same; and an improved process for making hydrogen peroxide from the direct combination of hydrogen and oxygen in the presence of said attrition resistant catalytic composite.

17 Claims, 5 Drawing Sheets

SILICA MICROSPHERES, METHOD OF IMPROVING ATTRITION RESISTANCE

CROSS REFERENCE TO EARLIER FILED APPLICATION

This application is a continuation-in-part of application Ser. No. 07/344,975, now abandoned, filed on Apr. 14, 1989.

BACKGROUND OF THE INVENTION

1. Field of the Invention

One aspect of the present invention relates to high-strength, non-agglomerated porous uniform microspheres of silica from 1.0 to 50 microns in size which are produced by spray drying a mixture comprising a colloidal silica sol and an effective amount of an additive selected from ammonium citrate or urea.

Another aspect of the present invention relates to an attrition resistant catalytic composite consisting essentially of metal crystallites distributed throughout said silica microspheres and method for preparing the same.

A further aspect of the present invention relates to an improved process for making hydrogen peroxide from the direct combination of hydrogen and oxygen in the presence of said catalytic composite consisting essentially of metal crystallites such as palladium and platinum-palladium distributed throughout high-strength, attrition resistant, non-agglomerated porous silica microspheres.

2. Description of the Related Art

The preparation of spheroidal ceramic particles by the process known as spray drying is well known as will be apparent from the ensuing discussion of prior art. Spray drying is advantageous in that it constitutes an economical preparation process. However, conventional spray drying of silica aquasols often produces hollow microspheres having a large core hole. Frequently, the spherical form is distorted due to rupturing of the microspheres during the spray drying process which produces amphoras or donut type particles as described in greater detail in K. Masters, "Spray Drying Handbook", chp. 8, Leonard Hill Books, London (4th ed. 1985). An impervious crust can form around each droplet during the process before drying is complete. When the crust becomes non-porous, vapor pressures within each droplet can build up until the droplet ruptures, forming the donut or amphora, or it can even disintegrate. The present invention provides for spray drying silica aquasols which avoids formation of an impervious crust around the droplets. Unique microspheres result which when calcined give high strength porous microspheres. These products are useful as commercial chromatographic column packing materials and high strength catalytic supports useful in fluid bed and slurry applications. More particularly, the products are useful as high strength catalytic supports in the catalytic process for the direct combination of hydrogen peroxide.

U.S. Pat. No. 4,131,542 describes a process for making amorphous silica grains which involves spray drying an aqueous silica sol to form micrograins. The micrograins are then acid washed and sintered.

U.S. Pat. No. 4,389,385 describes a process for preparing a porous gel of an inorganic material, such as silica, by dispersing solid primary particles of the material in a liquid, e.g., water, to form a sol containing colloidal particles which are aggregates of the primary particles and then spray drying the sol to form the gel. It is noted that the inorganic materials, i.e., the solid primary particles, for which the process is designed are derived from a vapor phase condensation method, such as by flame hydrolysis of volatile halides or alkoxides. The process requires aggregation of the primary particles prior to spray drying, such that each aggregate contains, for example, somewhere in the range of $1.5 \times 10^3$ particles or more. The range of mean pore diameter in the examples is 28 to 120 nm, which is very large in comparison with the primary particle size of the starting sol, 7 to 40 nm. Such an open structure would not be strong enough for process scale chromatographic columns or catalytic reactors.

Japanese Patent Publication 61-174,103 describes a process for producing porous spherical fine powders having an average particle size 1-20 microns from spray drying a mixture of a colloidal oxide sol and an inorganic oxide gel. It is suggested that the sol acts as a good binder for the gel resulting in the production of spherical particles which are not obtained using a gel alone. Even with both components present the spray drying conditions are quite critical and a temperature greater than 150° C. causes a breakdown in the balance between the shrinkage rate and the drying rate and non-spherical particles and cracked particles result. The process of the invention described hereinafter does not require the prior mixing of sol and gel, and a broad range of spray drying conditions is applicable. A considerably narrower particle size distribution and pore size distribution is obtained using the process of the present invention, which is particularly advantageous when the microspheres or granules produced therefrom are to be granules used as packing in chromatographic columns and catalytic applications.

In the direct combination of hydrogen and oxygen to form hydrogen peroxide, catalysts comprising metals supported on silica are documented in the art. For example, U.S. Pat. Nos. 4,772,458 and 4,832,938 describe amphora or donut type silica supported platinum and palladium and varying platinum-palladium compositions catalysts, which are prepared by spray drying a colloidal silica sol containing colloidal Pt, Pd or varying Pt/Pd compositions or their metal salts. The catalytic composite of the present invention exhibits high-strength and improved attrition resistance, and can be produced by spray drying a mixture comprising colloidal silica sol, an additive selected from ammonium citrate or urea, and metal salt or metal salts; alternatively, the catalytic composite can be produced by applying a metal salt or metal salts to said pre-formed silica microspheres. Attrition resistance is defined herein as the useful life of the catalyst, i.e., resistance of catalyst to mechanical degradation.

It has been discovered in the present invention that the catalytic composite demonstrates superior performance in the direct combination of H2 and O2 to hydrogen peroxide to the catalysts disclosed in the prior art. Microspheres also provide an excellent support for a wide range of metal catalysts which are used in many processes and which are described in the literature as being supported on a variety of materials, including silica. Such catalysts when brought into contact with reactants in agitated slurries, or fluidized beds are susceptible to deterioration by attrition. This decreases their activity over time and they have to be replaced more often because the catalyst breaks up into fine fragments. These fine fragments result in filtration problems as well. Clearly it is advantageous to increase the effective life of such catalysts. There is a strong economic incentive to develop process improvements and this has been accomplished by the supports of the present invention.

SUMMARY OF THE INVENTION

One aspect of the invention is an improved process for preparing high-strength, non-agglomerated porous microspheres of silica which range in size from 0.1 to 50 microns by spray drying a mixture comprising an aqueous silica sol, especially a commercially available silica sol such as those produced according to the procedures described in U.S. Pat. No. 2,574,902, and a soluble additive selected from ammonium citrate or urea. The process comprises the steps of:

(a) mixing an aqueous sol of colloidal silica particles, having a diameter in the range of 5 to 100 nm, with an effective amount of a soluble additive selected from ammonium citrate or urea;

(b) spray drying the mixture to form a powder consisting of microspherical silica particles and ammonium citrate or urea, said particles comprising a conglomerate of the original colloidal silica particles and said additive;

(c) calcining the spray dried powder to remove volatile components and to sinter the colloidal silica particles within the microspheres without fusing the microspheres into agglomerates.

The microspheres of this invention have a narrow particle size distribution and a very sharp pore size distribution. The term "narrow particle size distribution" means that at least 68% of the silica microspheres are between the size range of 0.3 d to 2.5 d, but ordinarily the microspheres will be between the size range of 0.5 d to 1.7 d, where d is the weight average particle size in microns. The term "sharp pore size distribution" means that at least 80% of the pores within any silica microsphere are between the size range of 0.2 p to 2.0 p, preferably between the range of 0.5 p to 1.5 p where p is the average pore size in nanometers.

The product powder from the spray drying step is calcined to remove any organic residues and sinter the primary particles to develop strength and porosity.

Microspheres produced according to the invention have an average diameter in the range of about 1.0 to 50 microns, but the average diameter will ordinarily range from 5 to 20 microns, which is preferred for commercial chromatographic column packing material.

Another aspect of the present invention is an attrition resistant catalytic composite consisting essentially of metal crystallites such as palladium or platinum-palladium distributed throughout said silica microspheres. Two methods for producing attrition resistant catalysts are useful in carrying out the invention and shall be described herein as the one-step method and the two-step method.

The one-step method for producing an attrition resistant catalyst comprises the steps of:

(a) preparing an aqueous solution of a metal salt or metal salts;

(b) dissolving an ammonium citrate additive in said solution;

(c) adding an aqueous sol of colloidal silica particles, having a diameter in the range of 5 to 100 nanometers;

(d) spray drying the mixture to form a powder consisting of microspherical silica particles, said particles comprising a conglomerate of the original silica particles with metal salts and ammonium citrate or urea distributed throughout;

(e) calcining to remove volatile components and to sinter the colloidal silica particles within the microspheres without fusing the microspheres into agglomerates; and (f) heating in a hydrogen atmosphere.

The one step method can be modified by adding a urea additive to step (c) thereby eliminating step (b).

Alternatively, the two-step method for producing an attrition resistant catalyst comprises first preparing said non-agglomerated porous silica microspheres as described above, then further comprises applying a metal salt or metal salts to said pre-formed silica microspheres and then heating in a hydrogen atmosphere.

A further aspect of the invention relates to an improved process for making hydrogen peroxide from the direct combination of hydrogen and oxygen in the presence of said catalytic composite consisting essentially of metal crystallites such as platinum, palladium and various platinum, palladium compositions dispersed throughout high-strength, non-agglomerated porous silica microspheres of silica.

DETAILED DESCRIPTION OF THE INVENTION

A. Improved Silica Microspheres

One aspect of the present invention resides in the discovery that uniform microspheres of silica can be obtained which have a narrow particle size distribution and a sharp pore size distribution by spray drying a commercially available silica aquasol which contains an additive selected from ammonium citrate or urea. These additives unexpectedly counteract the tendency of the silica aquasol droplets to form an impervious crust during spray drying which, in turn, prevents the droplets from rupturing.

The aquasols to which the process of the invention are applicable are generally commercially available aquasols, such as, for example, "Ludox" colloidal silica, available from E. I. du Pont de Nemours and Company. "Ludox" is an aqueous colloidal dispersion of silica particles in which the particles are discrete uniform spheres of silica which have no internal surface area or detectable crystallinity. These are referred to herein as the primary particles in describing the process of the invention. They are dispersed in an alkaline medium which results in a negative charge on the silica particle surface. Because of the negative charge, the particles tend to repel one another, and the dispersion remains stable, i.e., no gelation or agglomeration of the silica particles is observed.

Alternatively, aquasols useful in the invention may be prepared as described in U.S. Pat. No. 2,574,902, the teachings of which are incorporated herein by reference.

Figure 1:
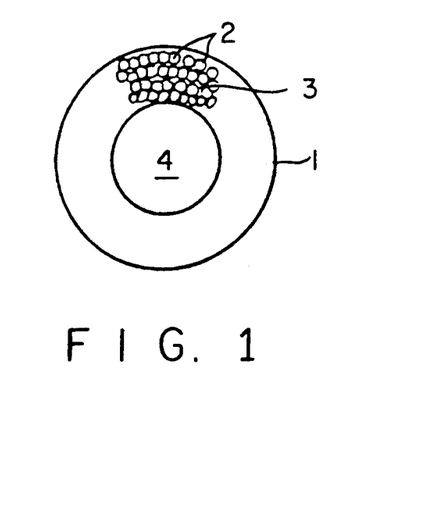
FIG. 1 is a schematic cross sectional view of a non-aggregated porous silica microsphere of the prior art.
Figure 2A:
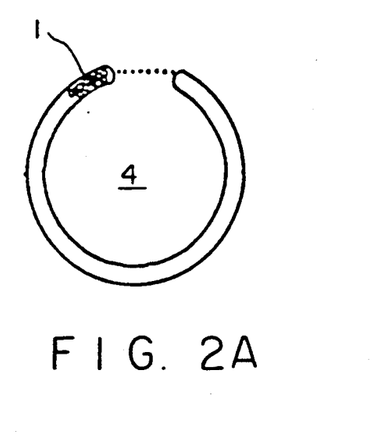
FIG. 2A and FIG. 2B are, respectively, schematic cross sectional views of amphora and donut like non-aggregated porous silica microspheres of the prior art.
Figure 2B:
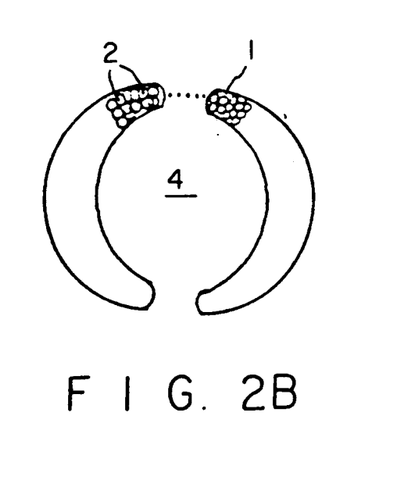
Figure 3:
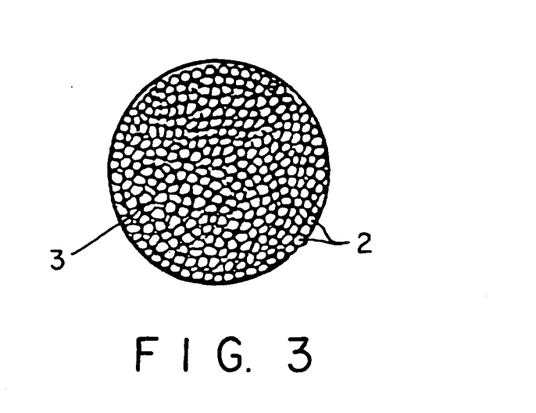
FIG. 3 is a schematic cross sectional view of a silica microsphere produced by the process of the invention.

The aquasols most useful in the invention are of generally uniform size colloidal silica particles in which the particles are preferably isodimensional. Leaf-like or rod shaped particles tend to form irregularly shaped microparticles during spray drying with broad pore size distributions, and this is undesirable. Colloidal silica particles having an average particle diameter in the range of about 5 to 100 nm are suitable according to the process of the invention, although for best results insofar as the properties of the finished powder are concerned the average particle diameters should range from 5 to 60 nm. In addition, the particles should be relatively uniform in size, i.e., about 75% of the total number of silica particles in the aquasol should preferably have a diameter in the range of 0.5 D to 2.0 D, where D is the weight average particle diameter.

Uniform particle size is important because this feature contributes to obtaining uniform pore size in the product microspheres which is a highly desirable feature for chromatographic separation. Weight average particle size and uniformity of particle size can be determined by methods described in "Measurement of Suspended Particles by Quasi-Electric Light Scattering", B. E. Dahneke, Wiley Interscience, N.Y., 1983.

Aquasols which contain colloidal silica particles which are smaller in average diameter than about 5 nm, such as those likely to be obtained by neutralizing sodium silicate with sulfuric acid, are generally not satisfactory because the particles tend to agglomerate very rapidly and irreversibly, i.e., the sols tend to be unstable and can gel very quickly. Aquasols which contain generally large particles, e.g., above about 100 nm average particle diameter, tend to produce weak microspheres with large pores when spray dried.

Aquasols useful in the process of the invention should be substantially free of non-volatile components other than the particulate material which constitutes the microsphere. By "non-volatile" is meant components which will not be volatilized away or burned out at temperatures equal to or below the calcining temperature. The presence of non-volatile inorganic anions and cations, which are undesirable, can be dealt with according to the procedures described in U.S. Pat. No. 2,577,458, the teachings of which are incorporated herein by reference.

Alkali metal and alkaline earth metal ions should be kept to a minimum because they can cause excessive sintering and loss of porosity, and they may even promote crystallization with radical changes in the structure and properties of the product.

Colloidal metal oxide particles other than silica can be used in the process of the invention if they meet the particle size requirements and have been previously coated with an impervious layer of silica. Coating finely divided metal oxide particles with silica is described in U.S. Pat. No. 2,885,366, the teachings of which are incorporated herein by reference.

It has also been found that a minor amount of other colloidal metal oxide aquasols can be mixed with the silica aquasols of the invention prior to spray drying. The products are high strength porous microspheres having the previously described characteristics. Oxides selected from a group comprising aluminum, titanium, zirconium, magnesium and zircon are useful in this respect. The molar ratio of silica to the metal oxide should be in excess of 10:1, and preferably as high as 20:1 in order to maintain the desired morphology of the resulting microspheres.

The concentration of particles in the silica aquasols can be adjusted over a wide range by the addition of water prior to spray drying the aquasol. For best results, water to be used for dilution of the sols should be purified by distillation and filtration through a water purification system equipped with mixed bed ion exchangers and an organic/colloid removal column. Microspheres having the desired characteristics can be made by spray drying aquasols which contain from about 2 to about 60% by weight silica along with the additives described above. If low silica concentrations are used, a larger volume of water has to be evaporated, and the process becomes less economical.

The size of the porous microspheres produced is a function of the spray drying conditions, the aquasol concentration, and the calcination conditions. Generally, for large diameter microspheres, the concentration of the sol should be as high as possible. The approximate maximum concentration of aquasols which can be made depends on the diameter of the silica particles, as can be seen in Table 1.

TABLE 1

| Particle Diameter (nm) | $SiO_2$ Wt % |
|---|---|
| 5 | 15 |
| 10 | 30 |
| 15 | 40 |
| 25 | 40 |
| 60 | 50 |
| 80 | 60 |

To produce the smallest porous microspheres, the concentration generally should be as low as practical. In addition, there should be no aggregation of the silica particles prior to spray drying as aggregation increases the likelihood of gelation of the sol during the process and the formation of microspheres having non-uniform pores.

A critical feature of the invention which has been observed to contribute to the formation of the desired high strength, porous silica microspheres, is the addition to the sol prior to spray drying of a water soluble additive selected from ammonium citrate or urea. The additive can be incorporated into the sol by simple mixing, and the resulting mixture can then be spray dried to form the microspheres.

The ratio of silica to additive is important with respect to whether the resulting microspheres will have the desired morphology. According to the invention, it has been found that the quantity of additive needed for a given quantity of silica in the aquasol is inversely related to the particle diameter of silica in the sol. Thus, the upper limit for the molar ratio of silica to additive in the case of ammonium citrate is about 10 for an aquasol having an average particle diameter in the range of about 10-20 nm and about 20 for aquasols having particles with average diameters in the range of about 50-60 nm. Where urea is the additive, the silica to urea ratios are about 2.5 and 4.5, respectively, for sols with particles falling into the same two size ranges. Generally speaking, for aquasols with different average particle diameters, there will be a range of ratios which are effective, and an optimum ratio can be established for each aquasol. The silica to additive ratio can be as low as 1, but in all cases a limiting factor will be the viscosity of the resulting mixture which must be fed by pumping to the spray dryer. Dilution with additional water may be necessary if the mixture becomes too viscous.

The mixture of aquasol and additive is usually prepared at room temperature. It is preferable that the aquasol/additive mixture be spray dried within a short time following preparation so that the silica particles in the sol will not have an opportunity to aggregate. Best results have been achieved when spray drying can be accomplished while the aquasol is stable, i.e., before aggregation or gelation of the individual silica particles can occur.

Spray drying the aquasol/additive solution converts the fluid suspension of primary particles into a dry powder comprising microspheres by spraying a feed stream of the mixture into a hot drying medium. K. Masters, Spray Drying Handbook, John Wiley & Sons, Inc., N.Y. (4th ed. 1985), the teachings of which are incorporated herein by reference, describes the principles, operation, and application of spray drying in great detail. When droplets of the spray come into contact with the drying medium, e.g., a heated gas stream comprising air or nitrogen, evaporation takes place from the droplet surface. Initially, sufficient water is present within the droplet to replenish water that is lost from the droplet surface. When the moisture content within the droplet falls to a level which is insufficient to maintain a saturated surface condition, a critical point is reached in the evaporation process as a crust begins to form at the droplet surface. According to the invention, the presence of ammonium citrate or urea in the mixture being fed to the spray dryer inhibits the formation of the crust on the droplet surface. Evaporation continues as moisture diffuses through the crust, and excessive pressure buildup within the droplet is avoided. The resulting particles are microspheres.

Product separation follows completion of the drying step when the dried product remains suspended in a gas stream of air or nitrogen. The product is separated from the gas stream by a cyclone separator and accumulates in the product collector. The yield of microspheres based on the silica feed to the spray dryer depends on the equipment used and the process conditions, and is usually in excess of 60% and can be as high as 90%. The remaining portion of the silica is recovered as oversize particles which fall to the bottom of the dryer tube and a fine fraction which passes through the cyclone separator and is trapped in bag filters.

The microspheres are then calcined to decompose and vaporize any organic material which may remain. It is important that the temperature is raised slowly to ensure that volatile materials, if any, are completely vaporized without allowing the individual primary particles to fuse together. The temperature is slowly brought into the range of 600°–700° C. over a period of 45 to 90 minutes. As thermal decomposition of any organic material occurs, the powder will darken in color and may become black. As the organic material is oxidized, it is vaporized, and the powder becomes white again. If too high a temperature is attained before all the organic material has been vaporized, the primary particles may sinter prematurely at their contact points which can trap the organic material and leave the final product dark in color. If undesirable alkali metal ions are present within the primary particles, sintering tends to occur more readily, and volatile organics can be more easily trapped.

After the organic material has been removed, heating of the particles is continued at the upper portion of the temperature range, or the temperature may even be adjusted upward to as high as 900° C., for a period of 1 to 4 hours which will sinter the individual primary particles which constitute the microspheres of the invention. Sintering greatly increases the strength of the microspheres, but it is important to minimize a loss in porosity which can also occur during this process. The average pore diameter is a function of upper temperature limit, time, and the size of the silica particles in the aquasol. There will always be some loss of porosity during the sintering step. The desired sintering conditions generally do not result in the formation of agglomerates of porous silica microspheres. If any weak adhesion is observed to occur, the product can be passed through a fine mesh wire sieve or subjected to sonification.

The presence of alkali metals and alkaline earth metals during the sintering process is undesirable because they lower the sintering temperature and can promote crystallization of the amorphous silica which causes radical changes in the structure of the product. If this occurs, calcination should be stopped as soon as the organic matter has been vaporized. At that point the powder can be cooled and washed with a strong acid, e.g., hydrochloric acid or nitric acid, which will neutralize the alkaline material, especially any sodium which may be present. The acid and salts can then be removed from the product by washing, and the final sintering step can be resumed.

Referring now to the drawings, FIG. 1 is a schematic cross sectional view of a typical non-aggregated porous silica microsphere obtained by the process described by Bergna et al. in U.S. Pat. No. 4,131,542. The outer periphery (1), the primary particles (2) and the pores (3) are shown. The large cavity or core hole (4) inside the microsphere is an undesirable feature, because it can detract from uniformity of performance and can reduce the ultimate strength of the microspheres.

FIGS. 2A and 2B are cross sectional views, respectively, of amphora and donut like non-aggregated silica microspheres which are obtained when the shell of a particle in FIG. 1 is ruptured during spray drying. This is usually due to excessive vapor pressure in the core hole (4) during the later stages of the spray drying process. This is undesirable in that it results in microspheres that have poor packing characteristics, inferior strength and performance.

FIG. 3 is a schematic cross sectional view of an individual spray dried porous silica microsphere produced by the process of the invention. As can be seen, the pores (3) are relatively uniform in size and may range from 2 to 20 nm depending upon the average particle diameter of the original colloid used. The primary particles (2) are discrete dense spherical particles of amorphous silica derived from the primary particles in the starting silica sol. These particles are sintered together at their points of contact. When this structure is uniform throughout the microsphere the pores (3) generally comprise less than 48% by volume and the silica more than 52% by volume of the microspheres. In the closest arrangement for packing of uniform spheres ("rhombohedral" type of packing with coordination number 12) empty space comprises 25.95 percent by volume. ("Micromeretics", J.M. Dalla Valle Pitman Publishing Co., N.Y., 1943). Theoretical maximum volume occupied by the solid spheres is therefore 74.05% of the total volume. Uniformity and density of the microsphere structure and interparticle bonding which links each particle to several neighboring particles, ideally twelve, results in high strength which is an important property in the uses for which these products are employed.

Figure 4:
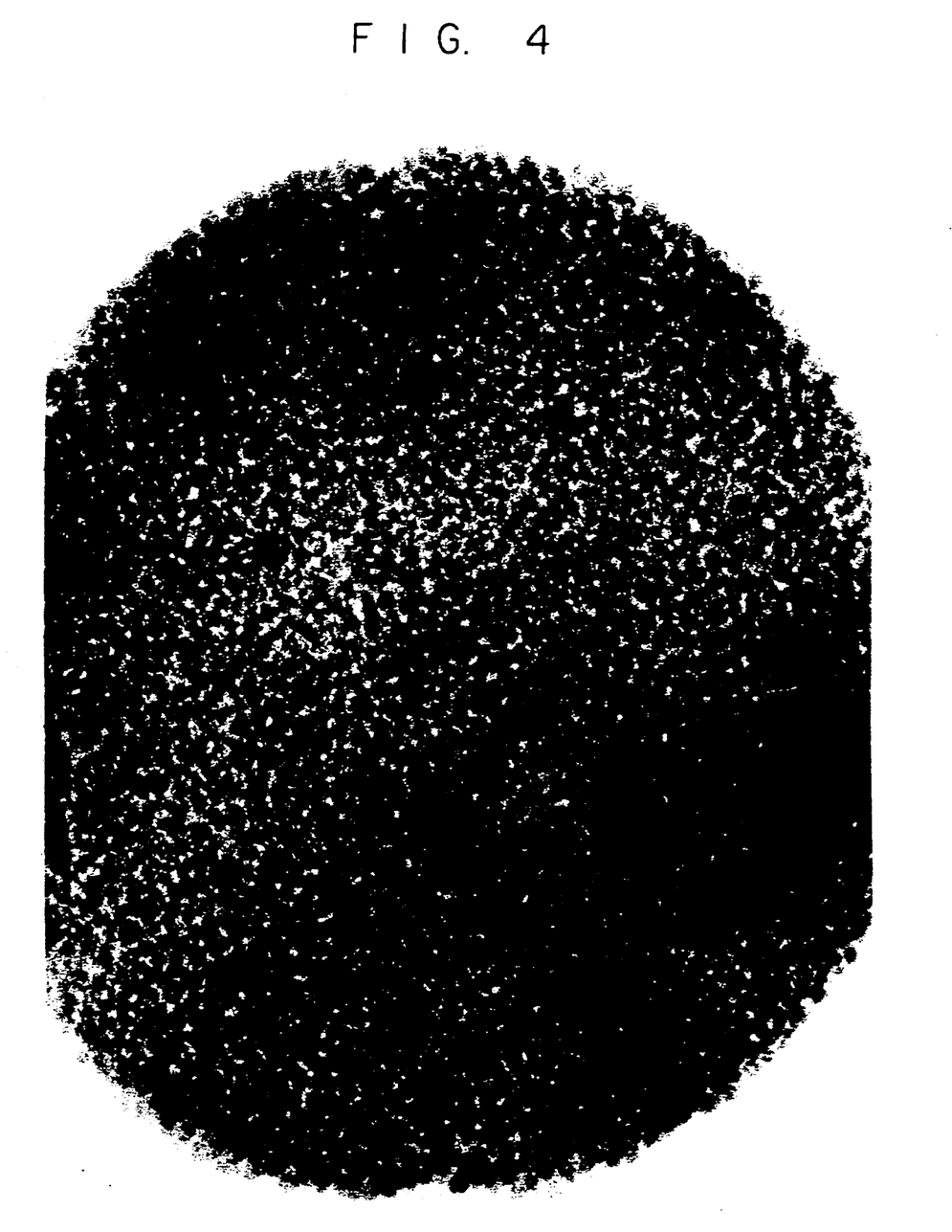
FIG. 4 is a transmission electron micrograph cross sectional view of a single porous microsphere produced by the process of this invention.
Figure 5:
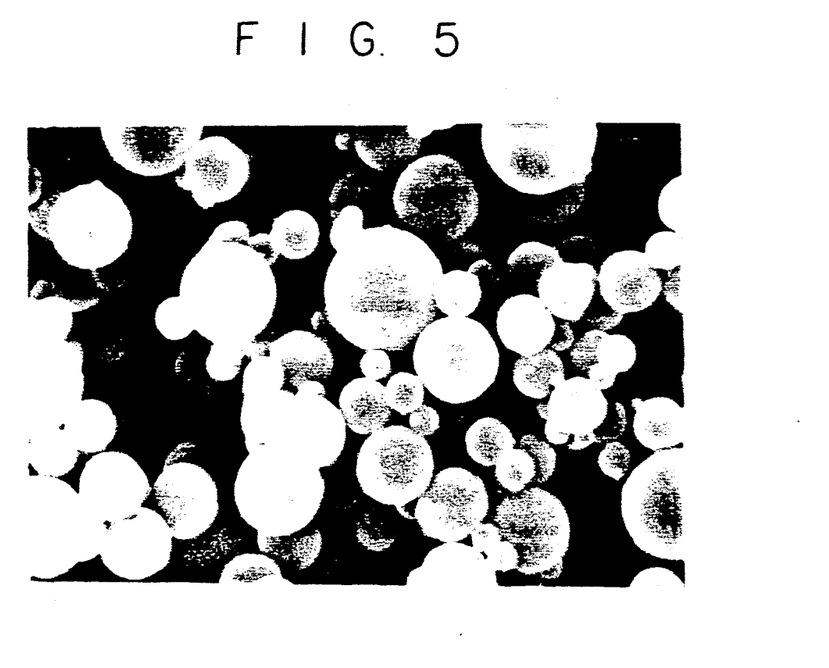
FIG. 5 is a scanning electron micrograph of a powder formed by the process of this invention.

The morphology of the spray dried and calcined microspheres of the invention has been examined by both scanning and transmission electron microscopy. The transmission electron micrograph, FIG. 4, is a cross sectional view of a single porous microsphere produced by the process of the invention. It corresponds to the structure shown diagramatically in FIG. 3. From this micrograph the narrow pore size distribution is apparent. FIG. 5 is a scanning electron micrograph, which is typical of the powders formed by the process of this invention. It clearly shows the narrow particle size distribution. This particular powder is the product of Example 6.

Particle size data for the microspheres of the invention was obtained using a Microtrac Model 7995 in conjunction with small and large particle analyzers.

Surface area and pore size distribution data for the microspheres following calcination/sintering was obtained using classic nitrogen physiosorption techniques with a fully automated Micromeretics Digisorb 2500 instrument. The methods used were similar to methods described in S. J. Greg, K.S.W. Sing, Adsorption, Surface Area and Porosity, Academic Press, 2nd ed., 1982.

B. Silica Supported Catalytic Composite and Method of Preparation

Another aspect of the present invention relates to an attrition resistant catalytic composite consisting essentially of metal crystallites such as palladium and various Pt-Pd compositions crystallites dispersed throughout said silica microspheres and a method for preparing the same.

Microspheres produced according to the invention have an average diameter in the range of about 1.0 to 50 microns, but the average diameter will ordinarily range from 5 to 20 microns. The average pore diameter may range from 2 to 20 nm. The aggregate pore volume of the silica microspheres is in the range of 10 to 40%. The microspheres of this invention have a narrow particle size distribution and a very sharp pore size distribution as defined hereinbefore.

The metal crystallites distributed throughout the porous silica microspheres may be any metal or mixtures thereof known to function as a catalyst. The Group VIII metals are preferred and of these the metals which are typically used to catalyze the direct combination of $H_2$ and $O_2$ to produce hydrogen peroxide are the most preferred such as palladium, platinum, rhodium and mixtures thereof. The metal crystallites are present on the supporting silica surface as very fine particles having an average diameter less than one micron and preferably in the range of 10 to 100 nm.

Another aspect of the invention relates to a method for producing an attrition resistant catalytic composite. The attrition resistance of the catalyst particles of the invention is measured using the following procedure. Thirty grams of the catalyst powder are mixed with 30 grams of 2 mm granular alumina grinding medium such as A1203 manufactured by Coors, Golden, Colo. The blended material is charged to a Rockwell Model 505, heavy duty orbital sander, manufactured by Rockwell, International, Pittsburgh, Penna.. The orbital sander is vibrated at 10,000 oscillations per minute (opm) for 30 minutes. The powder is separated from the grinding medium by a 1000 micron screen. The particle size distribution of the catalyst powder is determined before and after being vibrated on the orbital sander using a Microtrac Model No. 158705 Analyzer.

Two methods are useful in carrying out the invention, i.e., the one-step and the two-step methods.

The one step method comprises the steps of:

(a) preparing an aqueous solution of a soluble salt or soluble salts of a catalytic metal or metals;

(b) dissolving an ammonium citrate additive in said solution;

(c) adding to said solution an aqueous sol of colloidal silica particles, having a diameter in the range of 5 to 100 nm;

(d) spray drying the mixture to form a powder consisting of microspherical silica particles, said particles comprising a conglomerate of the original silica particles, metal salts and said additive distributed throughout;

(e) calcining said spray dried powder to remove volatile components and to sinter the colloidal silica particles within the microspheres without fusing the microspheres into agglomerates;

(f) heating in a hydrogen atmosphere to accomplish complete reduction of the metal salts and the catalytic activation of the metal crystallites.

The one step method can be modified by adding a urea additive to step (c) thereby eliminating step Alternatively, there is a two-step method comprising the steps of: first, preparing said high-strength, non-agglomerated porous silica microspheres as described above; second, applying a metal salt or metal salts to said pre-formed silica microspheres. The metal salts may be applied to the silica support by preparing a solution of water soluble salts of the desired metal(s) and slurrying with this a powder consisting of precalcined, i.e., pre-formed porous silica microspheres and then, for example, spray drying. The dry solids are then recovered and heated in a hydrogen atmosphere to complete reduction of the metal salts and to activate the catalytic metal crystallites.

The catalytic metal crystallites are introduced in the form of water soluble salts. Although any water soluble metal salt may be used the more readily available salts such as chlorides, nitrates, and acetates are preferred and particularly salts having anions which volatilize during the calcination step.

A critical feature of the process which results in the formation of the desired high strength, porous silica microspheres, is the presence of a water soluble additive selected from ammonium citrate or urea. The additive can be dissolved in the metal salt solution or it may be incorporated into the colloidal silica sol by simple mixing. The ratio of silica to additive is important with respect to whether the resulting microspheres will have the desired morphology and properties and is described in greater detail above. Colloidal silica sols to which the process of the invention is applicable are also described above.

The mixture of metal salts, additive and colloidal silica sol is usually prepared at room temperature. It is desirable that the mixture be spray dried within a short time following its preparation so that the colloidal silica particles will not have an opportunity to aggregate. Best results are achieved when spray drying can be accomplished while the aquasol is stable, i.e., before aggregation or gelation of the individual silica particles can occur.

Spray drying of the mixture and calcining the resulting powder is in accordance with the teachings above. After calcination the catalyst powder is heated to 300 to 400° C. in a hydrogen atmosphere to ensure complete reduction to metal crystallites and activation of the catalyst.

Figure 6A:
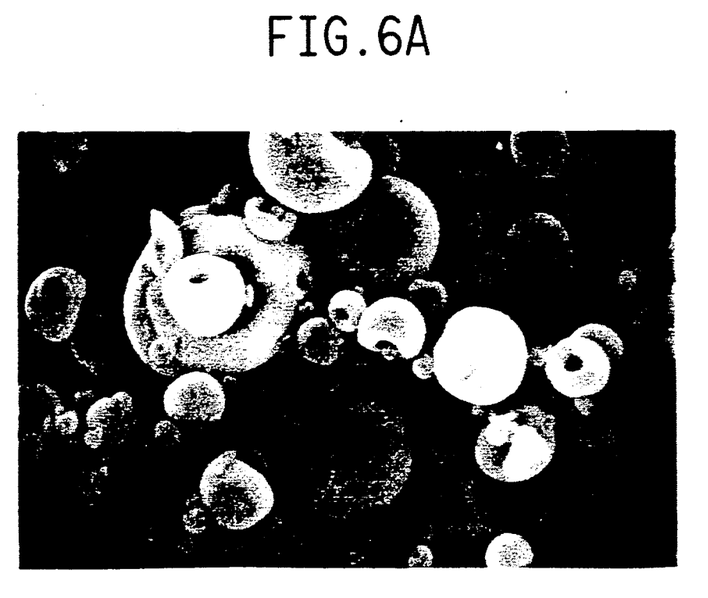
FIG. 6A is a scanning electron micrograph of an amphora and donut-like silica supported catalyst of the prior art.

Referring again to the drawings, FIG. 6A is a scanning electron micrograph of a bimetallic donut type silica supported catalytic composite obtained by the process described by Gosser et al. in U.S. Pat. No. 4,832,938. The morphology of the spray dried agglomerates is of donuts, amphoras and spheres.

Figure 6B:
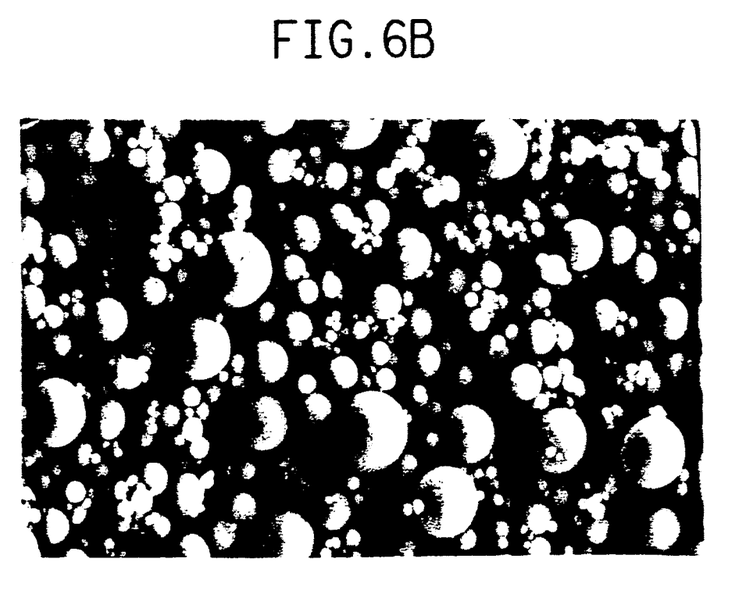
FIG. 6B is a scanning electron micrograph of a microspherical silica catalytic composite produced by the process of this invention.

Comparatively, FIG. 6B is a scanning election micrograph of a bimetallic silica microsphere supported catalytic composite obtained by the process of the present invention. The morphology of the spray dried powders is of uniform spherical attrition resistant particles.

Figure 7:
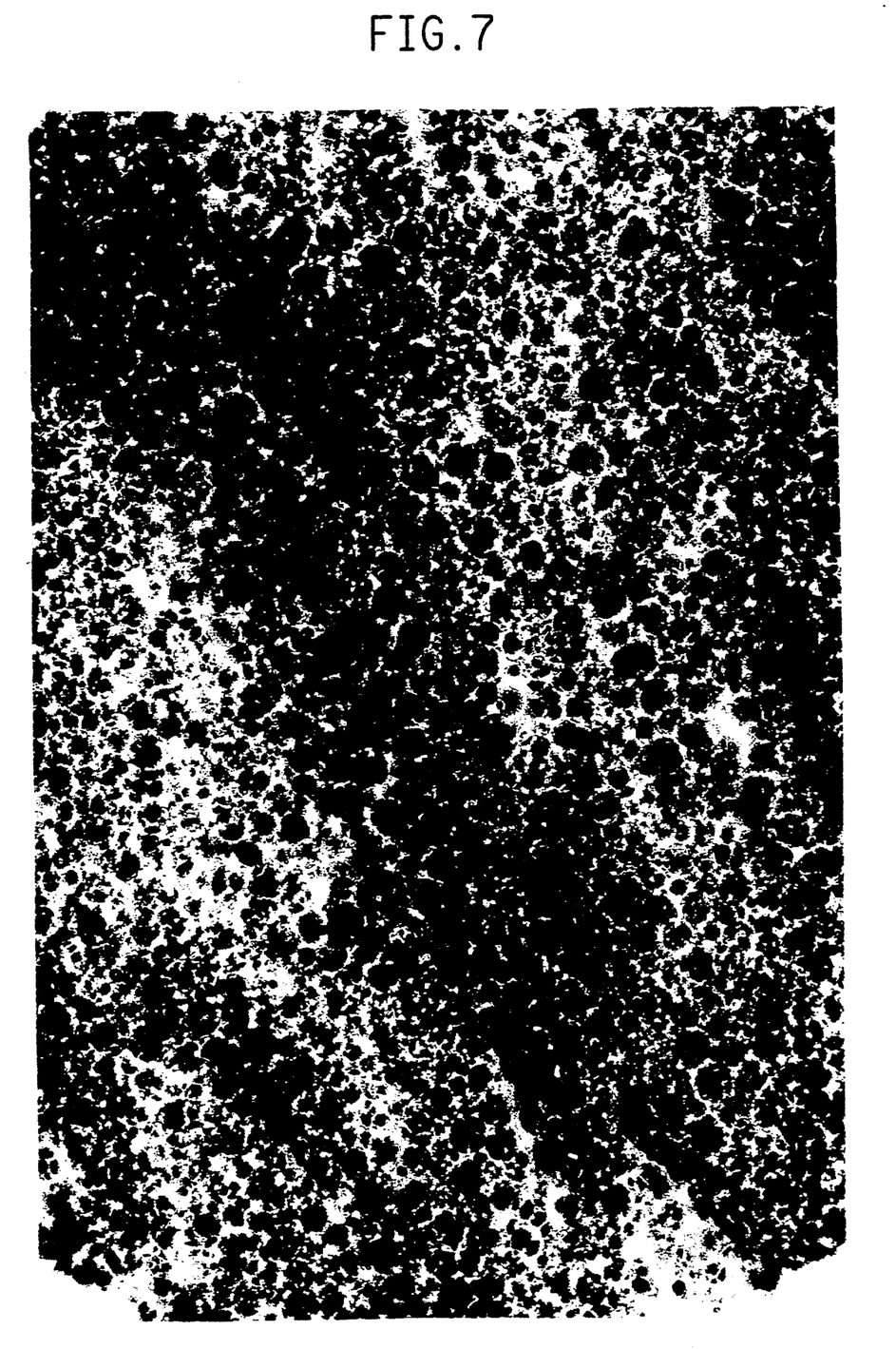
FIG. 7 is a transmission electron micrograph cross sectional view of a single microspherical silica of this invention.

FIG. 7 is a transmission electron micrograph cross-sectional view of a single bimetallic porous silica microsphere catalytic composite of the present invention. The metal is dispersed throughout the silica microsphere. It shows the generally even dispersion of the metal crystallites. This catalytic composite is useful in the direct combination of $H_2$ and $O_2$ to produce $H_2O_2$, and was prepared using the procedure described in Example 11.

C. Direct Combination of Hydrogen and Oxygen to Produce Hydrogen Peroxide

The further aspect of the invention relates to an improved method for making hydrogen peroxide by the direct combination of hydrogen and oxygen in the presence of the catalytic composite described hereinbefore. The production of hydrogen peroxide from the direct combination of hydrogen and oxygen in the presence of a supported metal catalyst is described in greater detail in U.S. Pat. No. 4,832,938 the teachings of which are incorporated herein by reference. In the process described in the present invention, the catalyst is agitated in an acidic aqueous reaction medium to which hydrogen and oxygen are supplied under pressure. One advantage of the catalyst of this invention is that it retains its mechanical integrity and thus its activity since it is more resistant to attrition.

In addition to possessing such desirable characteristics the catalyst of the invention is particularly efficient in the direct process for hydrogen peroxide, yielding very high concentrations of $H_2O_2$ (24 wt %), and high selectivity (80 mole %). Selectivity, expressed as mole percent, is the ratio of $H_2O_2$ moles formed/($H_2O_2$ + $H_2O$) moles formed multiplied by 100. These values compare with concentrations in the range of 12 to 20% and selectivities less than 70% for most catalysts described in the prior art. The importance of the invention is that the demonstrated advantages in the direct combination of $H_2O_2$ make this process more economically attractive from a commercial standpoint.

The advantages demonstrated in the synthesis of hydrogen peroxide in the presence of the catalyst composite of the invention are attributed to the high strength and attrition resistance of the porous silica microspheres. It will be appreciated by those skilled in catalysis that this type of support can be used in other processes. For example, in hydrocarbon reforming processes which are conducted extensively by the petroleum industry and where combinations of Group VIII metals are often used such as described in U.S. Pat. Nos. 4,131,628, 4,176,088 and 4,366,091. Examples of other catalysts which could advantageously be supported on porous silica microspheres are nickel used in U.S. Pat. No. 4,624,030 in the ammination of aliphatic alkane derivatives, copper chromite catalysts used in U.S. Pat. application Ser. No. 07/511124 for conversion of aliphatic diols to lactones.

The invention is described in greater detail in the following examples and the comparative showings illustrate the advantages of the present invention. They should not be construed as limiting in any way the scope of the invention.

EXAMPLE 1

Into a 4-liter beaker was added 3250 ml of water purified as described previously on Page 11. Ammonium citrate, 35.98 g [J. T. Baker A. R. Grade, Dibasic ammonium citrate $(NH_4)_2 H C_6H_5O_7$] was weighed out and added to the water while stirring. The measured pH of this solution was 5.08. Next, 180.37 g of Ludox AS40 (DuPont) a colloidal silica aquasol, containing 40% by weight of silica and having an average particle diameter of 22 nm was weighed out and added to the ammonium citrate solution while stirring. The pH of this mixture was 4.99, and the silica/additive molar ratio was 7.6. The entire sample contained 2.1% silica by weight, and it was spray dried using a Buchi 190 Mini Spray Dryer (Available from Brinkman Co.) It is a laboratory scale spray dryer which uses a two-fluid nozzle.

The mixture was atomized into a dryer tube with heated air. Oversize particles fell to the bottom where they were collected. The main fraction, containing microspheres in the desired size range was carried over to a cyclone separator which discharged the product to a collector. The fines were removed from the outlet gas in filter bags. Nitrogen was supplied at high pressure, 80 psi, to the nozzle and the mixture was delivered to the nozzle using a peristaltic pump. Nozzle size can be varied, and in this example the nozzle orifice diameter was 0.7 mm. The inlet temperature of the heated gas entering the dryer tube was 235° C. and the outlet gas temperature was 108° C. The slurry was dried over the course of 3¼ hours and 61 g of white powder was collected in the cyclone collector, corresponding to a yield of 56.4%.

The powder was distributed in alumina boats, to a depth of about ¼", and placed in a Thermolyne muffle furnace. The temperature was brought up to 650° C. over a period of 50 minutes and maintained at 650° C. for an additional 3 hours. After allowing the furnace to cool, the boats were removed and a pure white, free flowing powder was obtained.

This powder, when examined by scanning electron microscopy (SEM) using an Amray Model 1200 C11, at a magnification of 1030, was found to consist of uniform, non-agglomerated silica microspheres in the size range of 1 to 5 microns.

The surface area and average pore diameter were measured by classic nitrogen physiosorption techniques using a fully automated Micromeretics Digisorb 2500 instrument. The pore size distributions were obtained using the cylindrical pore model described in J. Am. Chem Soc. 73;373 (1951). The surface area was 152.5 m$^2$/g, the average pore diameter was 6.3 nm with 80% of the pores being between 4.2 nm and 8.8 nm. Particle size distribution was measured using a Microtrac Model 7995 and was as follows: $d_{16}=1.59$ microns, $d_{50}=3.26$ microns, $d_{84}=6.45$ microns.

EXAMPLE 2

Into a 4-liter beaker was added 3000 g water purified as described previously. Ammonium citrate 190.08 g (J. T. Baker) was weighed out and added to the water while stirring. The measured pH of this solution was 5.14, 903.6 g of Ludox ® AS-40 (Du Pont) was then added to the ammonium citrate solution while stirring. The pH of this mixture was 5.15 and the silica/additive molar ratio was 7.2. Over the course of 23 minutes 96.7 g of an acetate stabilized zirconia colloid, containing 20% by weight of zirconia and having an average particle diameter of 5-10 nm (Nyacol Products, Inc.) was added dropwise to the silica colloid-ammonium citrate mixture. Over the course of the addition, the pH dropped from 5.15 to 4.92. Thus, 5% of the total oxide solids was zirconia. The entire sample was spray dried as described in Example 1 over the course of 5¾ hours, and 312.0 g of powder was collected in the cyclone collector corresponding to a yield of 54.6%. This powder was calcined as described in Example 1 and then examined by SEM. The surface area and pore size distribution were determined as in Example 1. The surface area was found to be 174.6 m$^2$/g, the average pore diameter was 6.8 nm with 83% of the pores being between 2.8 nm and 10.5 nm. The particle size distribution was as follows: $d_{16}=2.33$ microns, $d_{50}=4.98$ microns, $d_{84}=9.99$ microns.

EXAMPLE 3

To 1500 g of deionized water was added 100 g of ammonium citrate (J. T. Baker) and which was stirred until dissolved. 503 g of Ludox ® AS-40 (Du Pont) was added to the ammonium citrate solution, with stirring. About 80% of the mixture, which contained 9.6% silica by weight and had a silica/additive molar ratio of 7.5 was spray dried using a Bowen BLSA pilot plant scale spray dryer.

The Bowen BLSA spray dryer was fitted with an electrically driven rotary device, specifically a 2" curved spherical edge wheel and the feed was gravity fed to the surface of the wheel. The wheel was spinning at 54,000 rpm and the atomized feed then passed into a drying chamber. The inlet temperature of the heated air was 238° C. and the outlet air temperature was 120° C. The main fraction, containing microspheres in the desired size range, was carried over to a cyclone separator which discharged product to a collector. The fines were removed from the outlet gas in filter bags. Oversize particles were collected at the bottom of the drying chamber.

The main powder fraction was fired as described in Example 1 to produce a free flowing white powder. This powder, when examined using a Philips 515 scanning electron microscope at a magnification of 1000, was found to consist of uniform, non-agglomerated silica microspheres in the size range of 3 to 15 microns.

The surface area and pore size distribution were measured as in Example 1. The surface area was 178.8 m$^2$/g, the average pore size diameter was 5.5 nm with 82% of the pores being between 2.8 and 7.2 nm. The particle size distribution was as follows: $d_{16}=4.97$ microns, $d_{50}=10.55$ microns, $d_{84}=20.44$ microns.

EXAMPLE 4

Into a stainless steel container was added 1370 g NALCOAG 1060 (Nalco Company) and 231 g ammonium citrate (J. T. Baker) and stirred until dissolved. This mixture contained 43% silica by weight and which had a silica/additive molar ratio of 11.18. A larger Bowen pilot plant spray dryer than described in Example 3 was used to spray dry the mixture. The mixture was delivered to a two-fluid nozzle by a Moyno Progressing Cavity Pump. Air at 13 psi was the atomizing gas. The heated gas inlet temperature was 265° C. and the outlet temperature was 122° C. The mixture was fed through the bottom of the spray dryer using a mixed flow configuration. The feed rate was 160 ml/min of slurry. The coarse fraction was collected at the bottom of the drying chamber. The fines were collected in a cyclone collector. Product was retrieved from the bottom of the drying chamber. This was screened through 270 mesh and held above 270 mesh. Powder was calcined as described in Example 1. The particle size distribution was as follows: $d_{16}=28.67$ microns, $d_{50}=48.90$ microns and $d_{84}=70.00$ microns.

Deionized water was substituted for the feed when about 80% of the feed had been utilized. Powder which had adhered to the surfaces in the spray dryer was removed and was collected in the cyclone separator.

This powder was calcined as before, and the physical properties were the same as those described for the previously collected fraction.

Examples 5 through 9 were conducted using different silica sols having a range of average particle size, silica concentration, molar ratio of silica/additive and stabilizing ion. The sols used are listed in Table 2 together with the manufacturer's specifications.

The amounts of sol, water and additive used are shown in Table 3 together with the percent silica solids, molar ratios and feed pH. The order of mixing is given in the footnotes to Table 3.

All the mixtures were spray dried and calcined as described in Example 1, unless otherwise indicated.

The calcined powders were characterized as described in Example 1 and results are shown in Table 4.

TABLE 2

| Physical Properties of Silica Sols Used | | | | |
|---|---|---|---|---|
| Type | Concentration (%) | Average Particle Diameter (nm) | pH | Stabilizing Counter Ion |
| Ludox ® SM[1] | 30 | 7 | 10.2 | Sodium |
| Ludox ® HS-40[1] | 40 | 12 | 9.7 | Sodium |
| Ludox ® AS-40[1] | 40 | 22 | 9.2 | Ammonium |
| NALCOAG-1060[2] | 50 | 60 | 8.5 | Sodium |

[1]Purchased from the Du Pont Company
[2]Purchased from Nalco Chemical Company

TABLE 3

Properties of Feed Mixtures

| Example No. | Water (g) | Colloid (g) | Additive (g) | % SiO$_2$ Solids | MR$^a$ | Feed pH |
|---|---|---|---|---|---|---|
| 5$^b$ | 252 | 60.38 Ludox ® HS40 | 12.17 Ammonium Citrate | 7.4 | 7.5 | 4.85 |
| 6$^c$ | 95 | 5.965 Ludox ® SM | 0.996 Ammonium Citrate | 1.8 | 6.8 | 5.02 |
| 7$^d$ | 600 | 602.8 NALCOAG 1060 | 120.2 Ammonium Citrate | 23 | 9.4 | 5.13 |
| 8$^e$ | 750 | 755.8 Ludox ® AS40 | 150.4 Urea | 18 | 2.0 | 9.4 |
| 9$^f$ | 25 | 100.43 NALCOAG 1060 | 12.506 Urea | 36 | 4.0 | 9.1 |

$^a$Molar ratio of silica to additive
$^b$Solid ammonium citrate was added to a diluted Ludox ® HS-40 sol. Calcination at 650° C. for 4 hours.
$^c$Solid ammonium citrate was added to a diluted Ludox ® SM sol.
$^d$Undiluted NALCOAG 1060 sol was added to ammonium citrate solution.
$^e$Undiluted Ludox ® AS40 sol was added to urea solution.
$^f$Urea solution was added to an undiluted NALCOAG 1060 sol.

TABLE 4

Calcined Powder Characterization; Particle Size Data$^3$

| Example # | Particle Size Distribution (Microns)$^4$ | | |
|---|---|---|---|
| | d$_{16}$ | d$_{50}$ | d$_{84}$ |
| 5 | 1.89 | 3.87 | 7.39 |
| 6 | 1.34 | 2.67 | 4.61 |
| 7 | 3.57 | 9.91 | 19.94 |
| 8 | 2.02 | 4.51 | 10.21 |
| 9 | 2.40 | 5.19 | 9.98 |

$^3$Morphological Examination by SEM of calcined powders 5-9 revealed non-agglomerated spherical particles in all cases.
$^4$d$_{16}$, d$_{50}$, d$_{84}$ correspond to the percentage less than the specified size.

d$_{16}$, d$_{50}$, d$_{84}$ correspond to the percentage less than the specified size.

TABLE 5

Calcined Powder Characterization; Surface Area and Pore Size Data

| Example # | Surface Area (m$^2$/g) | Avg. Pore Diameter (nm) | Range (nm) | % Between Range |
|---|---|---|---|---|
| 5 | 172.2 | 5.0 | 3.8–6.3 | 86 |
| 6 | 176.7 | 4.1 | 3.2–4.7 | 83 |
| 7 | 78.9 | 11.5 | 6.3–17 | 82 |
| 8 | 187.8 | 4.6 | 2.8–5.8 | 79 |
| 9 | 70.7 | 11.8 | 7.7–15.5 | 81 |

EXAMPLE 10

This example describes the composition and preparation of a catalytic composite consisting of about 0.05 wt % Pt and 1.0 wt % Pd on a porous silica The catalyst was used for the direct synthesis of hydrogen peroxide from hydrogen and oxygen.

A PdCl$_2$ solution was made up by adding 1.68 g of PdCl$_2$ to distilled water while stirring with a magnetic stirring bar, 2.5 ml of concentrated HCl was also added and the solution was heated to 50° C. The PdCl$_2$ was allowed to dissolve and then the solution was cooled to room temperature. To this was added 0.133 g H$_2$PtCl$_6$:6H$_2$O which dissolved immediately. Then 35 g of dibasic ammonium citrate [(NH$_4$)$_2$ H C$_6$H$_5$O$_7$] was also added while stirring. After the ammonium citrate dissolved, 251 g of Ludox AS 40 was added. The slurry was spray dried using a lab scale Buchi Mini-Spray Dryer using the following conditions:

| | |
|---|---|
| Nozzle size (mm) | 0.7 |
| Inlet Temperature (°C.) | 220 |
| Outlet Temperature (°C.) | 114 |
| Slurry Feed Rate (ml/min.) | 12 |
| Aspirator | maximum setting |
| N$_2$ (g) Pressure | 75 psi (supply) |
| | 700 ml/hr (nozzle flow) |

The spray dried product yield was about 67%. The spray dried product was a fine, cream-colored powder.

The spray dried powder was calcined for 3 hrs. at 650° C. in air using alumina boats in a Lindberg furnace. The calcined product was a dark mustard color.

The next step in the preparation was the hydrogen treatment. The powder was loaded into a quartz tube equipped with a fritted disc. The tube was placed in a vertical tube furnace. The sample was purged with helium at a flow rate of 100 ml/min for 15 minutes, then heated to 400° C. and held for one hour in helium. After one hour the gas was switched to hydrogen and the sample was held at 400° C. in hydrogen for one hour. It was then cooled to room temperature in hydrogen and then purged with helium. This is then the activated catalyst. The reduced catalyst was a fine grey-brown powder.

The surface area and average pore diameter were measured by classic nitrogen physiosorption techniques using a fully automated Micromeritics Digisorb 2500 instrument. The catalyst had a nitrogen surface area of 93.5 m$^2$/g, and an average pore diameter of 8.6 nanometers. Particle size distribution was measured using a Microtrac instrument and was as follows: d$_{10}$=1.35 microns; d$_{50=3.63}$ microns; d$_{90}$=7.46.

The catalyst was used in the preparation of hydrogen peroxide by the direct combination of hydrogen and oxygen. The apparatus for these experiments was a nominally 400 mL autoclave containing a glass liner. The free space in the empty autoclave-liner combination was about 350 mL. The autoclave was mounted on a shaking table in a metal barricade with facilities for adding and removing gases and monitoring the pressure and the temperature of the metal autoclave from outside of the barricade.

The working solution for running the shaker tube experiments was made up according to the following procedure: First a one liter solution was made up in the following manner; 250 ml of high purity low conductivity (HPLC) water, 50 ml of 1N sulfuric acid, 100 ml of 0.05 phosphoric acid. One hundred milliliters of a sodium bromide solution was made up by adding 0.515 g NaBr to one liter of water. These were mixed together to give a final concentration of 0.025 M sulfuric acid, 0.005 M phosphoric acid and 50 ppm bromide. 20 g of this solution was weighed out and used as the working solution for the shaker tube experiments.

The preparation was started by weighing the empty glass liner. The following components were charged to the glass liner: 100 mg of catalyst and the liner was reweighed, 20 g of working solution and the liner was again weighed. The liner was placed in the autoclave and the autoclave was placed in a cooling jacket on the shaker table. Argon (about 1000 psi) was added to check for leaks. The pressure was reduced to about 5 psia and then shaking was commenced. Then about 350 psia $H_2$ was added and about 1650 psia $O_2$ was added slowly to increase pressure to about 2000 psia. The shaking was carried out for about three hours. The remaining gas was released slowly and the vessel was filled to approximately 100 psia with argon and vented three times to remove the last of the $H_2/O_2$ mixture. The liner was then removed from the autoclave and reweighed. A portion of the reaction mixture was titrated with cerric sulfate solution. The wt % $H_2O_2$ obtained from the titration and the weight gain were used to calculate the selectivity as moles $H_2O_2$ formed divided by the sum of moles $H_2O$ and moles $H_2O_2$ formed. This value was multiplied by 100 to express the selectivity as a percentage. The $H_2O_2$ content was found to be 24.02 wt % and the selectivity to $H_2O_2$ was 78.90%.

The results obtained using different amounts of the catalyst in the synthesis of hydrogen peroxide are given in Table 7.

EXAMPLE 11

This example describes the preparation of a catalyst consisting of about 0.05 wt % Pt and 0.94 wt % Pd on a porous silica microsphere support. The catalyst was used for the direct synthesis of hydrogen peroxide from hydrogen and oxygen.

This catalyst is a blend of seven separate batches. The batches were all prepared similarly. The preparation details follow for the one step spray drying procedure. A PdCl2 solution was made up the night before the actual run by using 2,000 ml of distilled water and adding 10.744 g of $PdCl_2$ and 15 ml of concentrated hydrochloric acid. This solution was allowed to stir overnight and then was filtered prior to use. Then 0.884 g $H_2PtCl_6$ was added to this solution as well as 230 g of dibasic ammonium citrate [$(NH_4)_2$ H $C_6H_5O_7$]. After the ammonium citrate dissolved 1370 g of NALCO AG 1060 colloidal silica was slowly added while stirring. This mixture was then spray dried using a Buchi laboratory scale spray dryer with an inlet temperature of 215° C. and an outlet temperature of 111° C. Approximately 650.4 g of product was collected from the cyclone separator. This material was calcined and then treated in hydrogen in the following manner: The sample was loaded into alumina boats and put into a Fisher Model 497 box furnace. The sample was heated to 650° C. in air at 13° C./min heat-up rate. The powder was held at 650° C. for three hours and then cooled to room temperature. The next step in the preparation was the hydrogen treatment. The powder was loaded into a quartz tube equipped with a fritted disc. The tube was placed in a vertical tube furnace. The sample was purged with helium at a flow rate of 100 ml/min for 15 minutes, then heated to 400° C. and held for one hour in helium. After one hour the gas was switched to hydrogen and the sample was held at 400° C. in hydrogen for one hour. It was then cooled to room temperature in hydrogen and then purged with helium. This is then the activated catalyst.

The performance of this catalyst in the synthesis of hydrogen peroxide is shown in Table 7.

ATTRITION TEST

This catalyst composition, was mixed with two similar products made using the same procedure. Thirty grams of the mixed powder, identified as catalyst A, were mixed with 30 g of 2 mm granular alumina grinding medium such as $Al_2O_3$ manufactured by Coors, Golden Colo. The blended material was charged to a Rockwell Model 505, heavy duty orbital sander, manufactured by Rockwell, International, Pittsburgh, Penna., and vibrated at 10,000 o.p.m. for 30 minutes. The catalyst powder was separated from the grinding medium by a 1000 micron screen. The particle size distribution of the powder, before and after being vibrated in the orbital sander was determined using a Microtrac Model 158705 Analyzer.

COMPARATIVE EXAMPLE

A catalyst powder composition was made using the spray drying method of U.S. Pat. No. 4,832,938, 1.5816 g of $PdCl_2$ was dissolved in 1750 ml of distilled water containing 11.0 ml of concentrated HCl and heated to about 50° C. The solution was cooled and then 0.1286 g of $H_2PtCl_6$ was added and readily dissolved. The solution was stirred and 250 ml of Ludox HS40 a product of Du Pont was added and stirring was continued for an additional five minutes. The solution was then spray dried as described in Example 4 of U.S. Pat. No. 4,832,938 using a spray dryer inlet temperature of about 222° C. and an outlet temperature of 111° C. The material collected from the spray drying was a peach colored powder and 72.3 g was obtained. The powder was treated with hydrogen, as described in Example 1 of U.S. Pat. No. 4,832,938. The resulting catalyst powder when examined by SEM was found to contain many donut shaped particles. This powder identified as catalyst B, was subjected to the same orbital sander vibration test.

The results of the attrition tests on the two powders are summarized in Table 6.

TABLE 6

| Particle Size Distribution | Particle Size d (Microns)[1] | | | |
|---|---|---|---|---|
| | Catalyst A | | Catalyst B | |
| | Before | After | Before | After |
| $d_{10}$ | 1.43 | 1.43 | 1.77 | 1.30 |
| $d_{50}$ | 3.94 | 3.94 | 4.73 | 3.74 |
| $d_{90}$ | 8.40 | 8.40 | 9.44 | 7.17 |

[1] $d_{10}$, $d_{50}$, $d_{90}$, correspond to the percentage less than the specified size.

There was no measurable change in the particle size distribution of catalyst A and consequently no breakdown of the catalyst particles. In the case of catalyst B a considerable shift of the particle particle size distribution occurred, corresponding to lower particle size, and this is attributed to attrition of the particles of catalyst B.

EXAMPLE 12

This example describes the preparation of a catalyst consisting of about 0.05 wt % Pt and 1.0 wt % Pd on a porous silica microsphere support by a two step process comprising first preparing the silica support and applying the catalytic metals to it. The catalyst was used for the direct synthesis of hydrogen peroxide from hydrogen and oxygen metals.

The synthesis of the silica supported catalyst was carried out in a two step process. The silica microspheres were first synthesized according to Example 8 as described hereinbefore. The precalcined silica microspheres generated were then used as the support material for the bimetallic catalyst. To prepare the bimetallic catalyst the following procedure was followed:

0.026 g $H_2PtCl_6$ and 0.316 g $PdCl_2$ were dissolved in one liter of distilled water. This solution was heated to 60–70° C. and 1.0 ml of HCl was added to get the PdCl₂ into solution. The pH of this mixture was 1.2. To this solution was added 20 g of the calcined silica microspheres prepared according to Example 8. The resulting slurry was stirred for 30 minutes and then spray dried using a Buchi laboratory scale spray dryer. The inlet temperature was measured as 220° C. and the outlet temperature was 117° C. There was 15.551 g of orange colored powder collected in the cyclone separator when the spray drying was completed. This powder was then treated in hydrogen to reduce the metal according to the following procedure: The powder was loaded into a quartz tube containing a fritted-disc. This tube was put into a vertical tube furnace. The flow meter was set at 100 ml/min. and the sample was purged with helium for twenty minutes, after which the gas was switched to hydrogen and allowed to flow at room temperature for ten minutes, at which time the temperature was elevated to 300° C. The sample was held at 300° C. for one hour in hydrogen. It was then cooled in hydrogen until room temperature was reached and then flushed with helium for twenty minutes. This material was then used as the active catalyst.

Chemisorption analysis of this sample was carried out and the metal surface area was determined to be 28 m²/g of palladium and platinum. The performance of the catalyst in the synthesis of hydrogen peroxide is shown in Table 7.

EXAMPLE 13

This example is the preparation of a catalyst consisting of about 0.05 wt % Pt and 1.0 wt % Pd on a porous silica microsphere support. The preparation was similar to that described in Example 11. The performance of this catalyst in the synthesis of hydrogen peroxide is shown in Table 7.

EXAMPLE 14

This example is the preparation of a catalyst consisting of about 0.1 wt % Pt and 1.9 wt % Pd1 on a porous silica support. The preparation was similar to that described in Example 11 with the difference that double the quantities of PdCl₂ (21.488 g) and H₂PtCl₆ (1.768 g) were used. The performance of this catalyst in the synthesis of hydrogen peroxide is shown in Table 7.

TABLE 7

| Hydrogen Peroxide Synthesis | | | | | |
|---|---|---|---|---|---|
| Catalyst of Example No. | Catalyst (mg) | Working Soln. (g) | Br-ppm | Hydrogen Peroxide | |
| | | | | Concn. wt % | Selectivity |
| 10 | 25 | 20 | 50 | 19.16 | 78.69 |
| 10 | 50 | 20 | 50 | 22.59 | 78.42 |
| 10 | 100 | 20 | 50 | 24.02 | 78.90 |
| 11 | 50 | 20 | 50 | 17.19 | 73.14 |
| 11 | 200 | 20 | 50 | 24.92 | 80.61 |
| 12 | 25 | 20 | 50 | 18.11 | 75.63 |
| 12 | 50 | 20 | 50 | 22.21 | 75.21 |
| 13 | 100 | 20 | 5 | 22.45 | 80.20 |
| 13 | 100 | 20 | 50 | 22.83 | 83.76 |
| 14 | 25 | 20 | 50 | 18.87 | 79.65 |

What is claimed is:

1. A process for preparing high-strength, non-agglomerated porous uniform silica microspheres which comprises the steps of:
   (a) mixing an aqueous sol of colloidal silica particles, having a diameter in the range of 5 to 100 nm, with an effective amount of a soluble additive selected from the group consisting of from ammonium citrate and urea to inhibit premature formation of an impervious crust.
   (b) spray drying the mixture to form a powder consisting of microspherical silica particles, said particles comprising a conglomerate of the original colloidal silica particles and said additive; and
   (c) calcining the spray dried powder to remove volatile components and to sinter the colloidal silica particles within the microspheres without fusing the microspheres into agglomerates.

2. The process of claim 1, which further comprises the steps of:
   (d) preparing an aqueous solution of a metal salt or metal salts;
   (e) slurrying said powder with said solution; and
   (f) drying, treating in a hydrogen atmosphere the resulting powder.

3. A process for producing an attrition resistant catalytic composite consisting essentially of fine metal crystallites dispersed throughout high strength, non-agglomerated porous silica microspheres which comprises the steps of:
   (a) preparing an aqueous solution of a metal salt or metal salts;
   (b) dissolving an additive selected from ammonium citrate or urea;
   (c) adding an aqueous sol of colloidal silica particles, having a diameter in the range of 5 to 100 nanometers;
   (d) spray drying the mixture to form a powder consisting of microspherical silica particles, said particles comprising a conglomerate of the original silica particles with metal salts and ammonium citrate or urea distributed throughout; and
   (e) calcining to remove volatile components and to sinter the colloidal silica particles within the microspheres without fusing the microspheres into agglomerates.

4. The process of claim 3, which further comprises the step of:
   (f) treating in a hydrogen atmosphere.

5. The process of claim 1 or claim 2 or claim 3 or claim 4 in which the average diameter of the colloidal silica particles in the aqueous sol is in the range of 5 to 60 nm.

6. The process of claim 1 or claim 2 or claim 3 or claim 4 in which the soluble additive is ammonium citrate.

7. The process of claim 5 in which the soluble additive is ammonium citrate.

8. The process of claim 1 or claim 2 or claim 3 or claim 4 in which the soluble additive is urea.

9. The process of claim 5 in which the soluble additive is urea.

10. The process of claim 7 in which 75% of the total number of colloidal silica particles in the aqueous sol have a diameter in the range of 0.5 D to 2.0 D where D is the weight average diameter.

11. The process of claim 7 in which the colloidal silica particles in the aqueous sol have an average diameter of 10 to 20 nm, and the molar ratio of silica to ammonium citrate does not exceed 10.

12. The process of claim 7 in which the colloidal silica particles in the aqueous sol, have an average diameter of 50 to 60 nm and the molar ratio of silica to ammonium citrate does not exceed 20.

13. The process of claim 9 in which the colloidal silica particles in the aqueous sol have an average diameter of 10 to 20 nm and the molar ratio of silica to urea does not exceed 2.5.

14. The process of claim 9 in which the colloidal silica particles in the aqueous sol have an average diameter of 50 to 60 nm and the molar ratio of silica to urea does not exceed 4.5. range of 1.0 to 50 microns and an average pore size of 2 to 20 nanometers which are produced by the process of claim 5.

15. The process of claim 1 or claim 2 or claim 3 or claim 4 in which the spray dried powder is calcined at a temperature in the range of about 600° to 700° C. for up to 90 minutes.

16. In a process for preparing silica particles wherein an aqueous sol of colloidal silica is spray dried, the improvement comprising the step of: spray drying said aqueous sol of colloidal silica in the presence of an effective amount of a soluble additive selected from ammonium citrate or urea to inhibit premature formation of an impervious crust during spray drying, resulting in high strength, non-agglomerated, spherical silica microspheres more resistant to attrition.

17. The process of claim 9 in which 75% of the total number of colloidal silica particles in the aqueous sol have a diameter in the range of 0.5 D to 2.0 D where D is the weight average diameter.

* * * * *

UNITED STATES PATENT AND TRADEMARK OFFICE
CERTIFICATE OF CORRECTION

PATENT NO. : 5,128,114
DATED : July 7, 1992
INVENTOR(S) : Jo-Ann T. Schwartz

It is certified that error appears in the above-identified patent and that said Letters Patent is hereby corrected as shown below:

Column 4, line 21, change "platinum,palladium" to "platinum-palladium".

Column 4, line 23, delete "of silica".

Column 4, lines 46-47, after "a", insert "single" and after "silica" insert "supported catalytic composite produced by the process".

Column 10, line 39, after "eliminating step", insert "(b)".

Column 11, line 64, change "70%" to "70 mole %".

Column 12, line 15, after "derivatives" insert "and".

Column 15, line 65, change "$H_2PtCl_6:H2O$" to "$H_2PtCl_6:6H_2O$".

Column 16, line 36, change "$d_1 0$" to "$d_{10}$".

Column 16, line 53, after "0.05" insert "M".

Column 17, line 15, change "78.90%" to "78.90 mole %".

UNITED STATES PATENT AND TRADEMARK OFFICE
CERTIFICATE OF CORRECTION

PATENT NO. : 5,128,114

DATED : July 7, 1992

INVENTOR(S) : Jo-Ann T. Schwartz

It is certified that error appears in the above-identified patent and that said Letters Patent is hereby corrected as shown below:

Column 17, line 29, change "PdCl2" to "PdCl$_2$".

Column 19, line 39, change "Pdl" to "Pd".

Column 19, line 50, below "Selectivity", insert "mole %".

Column 19, line 68, delete "from".

Column 21, lines 6-8, delete "range of 1.0 to 50 microns and an average pore size of 2 to 20 nanometers which are produced by the process of claim 5".

Signed and Sealed this

Twenty-third Day of November, 1993

Attest:

BRUCE LEHMAN

Attesting Officer     Commissioner of Patents and Trademarks